(12) United States Patent
Stern et al.

(10) Patent No.: US 7,511,771 B2
(45) Date of Patent: Mar. 31, 2009

(54) COLOR IMAGE PROJECTION SYSTEM AND METHOD

(75) Inventors: Miklos Stern, Woodmere, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 681 days.

(21) Appl. No.: 11/263,488

(22) Filed: Oct. 31, 2005

(65) Prior Publication Data

US 2007/0097501 A1 May 3, 2007

(51) Int. Cl.
H04N 9/28 (2006.01)
G03B 21/26 (2006.01)

(52) U.S. Cl. .......................................... 348/744; 353/31

(58) Field of Classification Search ................. 348/744, 348/750, 760, 780; 353/31, 28; 345/204, 345/207, 208
See application file for complete search history.

(56) References Cited

U.S. PATENT DOCUMENTS

| | | | | |
|---|---|---|---|---|
| 3,639,684 A | * | 2/1972 | Levine | 348/269 |
| 5,822,022 A | * | 10/1998 | Deter et al. | 348/750 |
| 6,012,023 A | | 1/2000 | Iijima et al. | |
| 6,309,072 B1 | * | 10/2001 | Deter | 353/31 |
| 6,636,275 B1 | * | 10/2003 | Wilson | 348/750 |
| 6,873,460 B1 | | 3/2005 | Burstyn et al. | |
| 7,227,618 B1 | * | 6/2007 | Bi | 355/67 |
| 7,302,174 B2 | * | 11/2007 | Tan et al. | 396/155 |
| 7,414,621 B2 | * | 8/2008 | Yavid et al. | 345/204 |
| 7,446,822 B2 | * | 11/2008 | Stern et al. | 348/747 |
| 2004/0017518 A1 | | 1/2004 | Stern et al. | |
| 2004/0017587 A1 | | 1/2004 | Jaffe et al. | |
| 2006/0221022 A1 | | 10/2006 | Hajjar | |

* cited by examiner

Primary Examiner—Paulos M Natnael
(74) Attorney, Agent, or Firm—Kirschstein, et al.

(57) ABSTRACT

An image projection system projects an image on a projection screen having phosphor particles for converting incident violet light into green light which, together with red and blue light, creates the image in full color. The phosphor particles are bound in a binding material whose index of refraction matches the index of refraction of the phosphor particles to reduce back scattering of light.

20 Claims, 7 Drawing Sheets

COLOR IMAGE PROJECTION SYSTEM AND METHOD

BACKGROUND OF THE INVENTION

1. Field of the Invention

The present invention generally relates to projecting a two-dimensional image in color on a rear projection screen while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to scan a laser beam over a raster pattern. However, the known image projection systems project the image with limited resolution, typically less than a fourth of video-graphics-array (VGA) quality of 640×480 pixels. Red, blue and green lasers are employed to project the image in color. The physical size and power consumption of the known projection systems are relatively high, thereby rendering them impractical for use in miniature, hand-held, battery-operated applications, due in large part to the use of infrared diode-pumped Nd:YVO4 crystal lasers with crystal doublers to generate the green beam, as well as acousto-optical modulators for pulsing the green beam. Also, the low scan rates of the scan mirrors generate objectionable noise and vibration during use.

SUMMARY OF THE INVENTION

Objects of the Invention

Accordingly, it is a general object of this invention to provide an image projection system that projects a sharp and clear, two-dimensional, full color image on a rear projection screen.

Another object of this invention is to minimize power consumption, cost and complexity in such projection systems by not utilizing green lasers and their associated circuitry.

Still another object of this invention is to increase the resolution of the color image projected by such systems.

Yet another object of this invention is to eliminate the use of green lasers in such systems.

An additional object of this invention is to provide a novel screen on which full color images are visible.

An additional object is to provide a miniature, compact, lightweight, and portable color image projection system useful in many instruments of different form factors.

FEATURES OF THE INVENTION

In keeping with these objects and others which will become apparent hereinafter, one feature of this invention resides, briefly stated, in an image projection system for projecting a two-dimensional, color image. The arrangement includes a projection screen; a plurality of red, blue and violet lasers for respectively emitting red, blue and violet laser beams; an optical assembly for forming a composite beam of the red, blue and violet beams; a scanner for sweeping the composite beam as a pattern of scan lines across the screen, each scan line having a number of pixels; and a controller for causing selected pixels to be illuminated, and rendered visible, by the composite beam to produce the color image.

In accordance with one aspect of this invention, a multitude of phosphor particles is provided as part of the projection screen for converting the violet beam to a green laser beam to produce the image in red, blue and green colors. The phosphor particles tend to back scatter light. Hence, the phosphor particles are bound in a binding material whose index of refraction matches the index of refraction of the phosphor particles. The phosphor particles bound with the binding material advantageously form a plate which is light-transmissive.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The lasers, scanner, controller and optical assembly preferably occupy a volume of less than seventy cubic centimeters.

The projection screen includes a collimating lens, for example, a Fresnel lens, for collimating the red, blue and violet beams into parallel light rays; a lenticular lens array having a plurality of lenses for focusing the parallel light rays at a focusing plane at which the light-transmissive plate is located; and a mask having a plurality of apertures operative for transmitting incident red, blue and green beams therethrough, thereby enabling a red, blue and green (RBG) image to be displayed on the screen. To increase the gain of the incident beams on the screen, a plurality of lenslets is provided, one for each aperture of the mask.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 2:
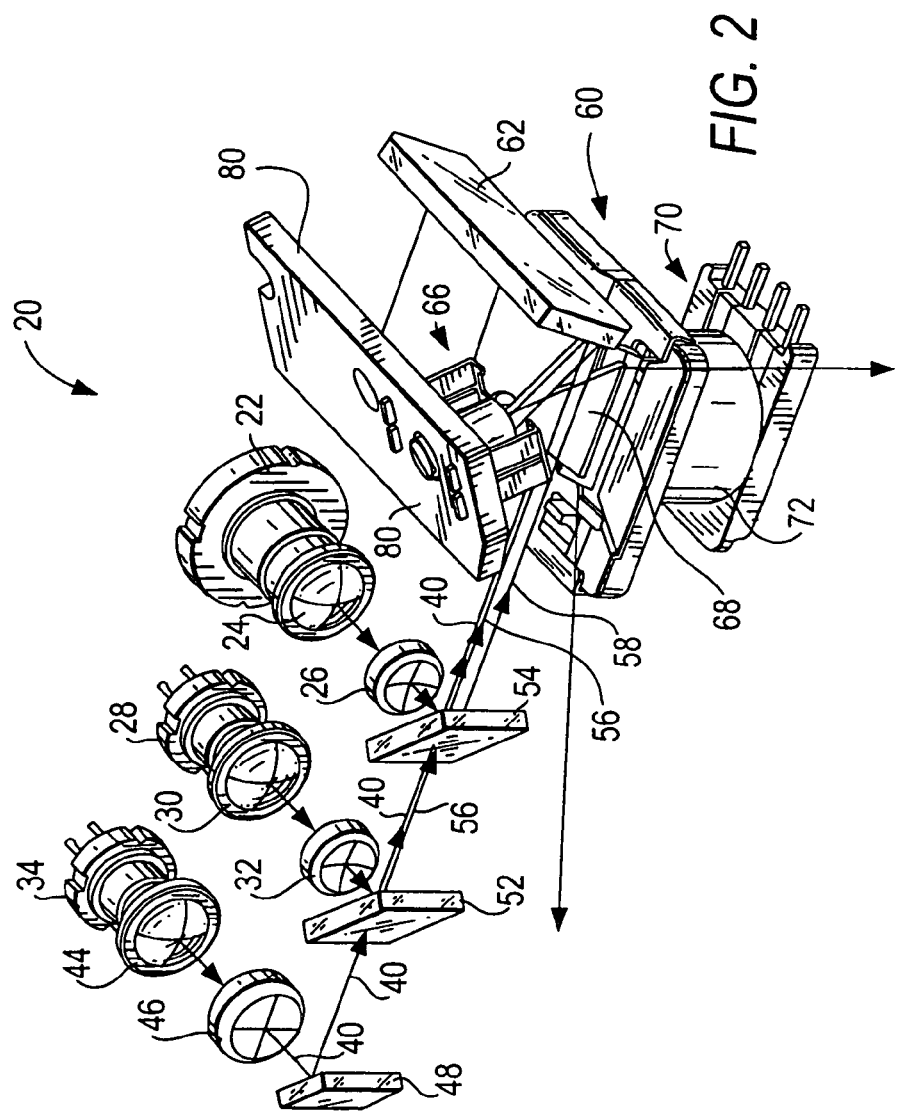
FIG. 2 is an enlarged, overhead, perspective view of an image projection arrangement for installation in the system of FIG. 1.
Figure 1:
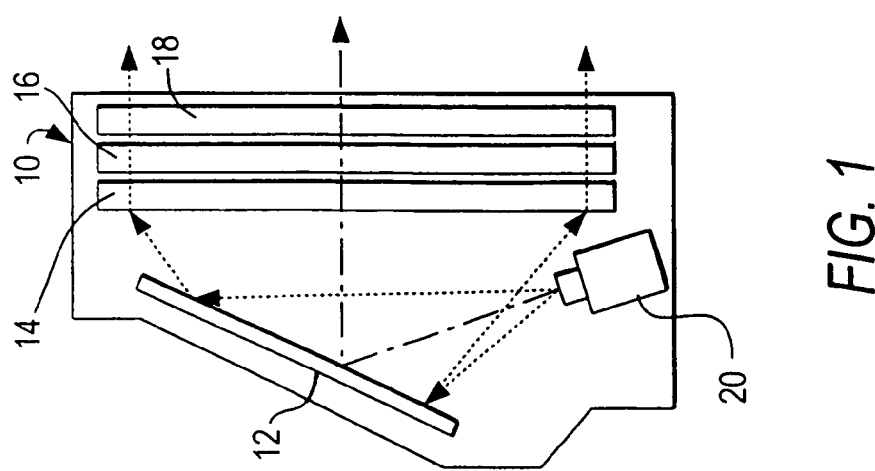
FIG. 1 is a diagrammatic view of a system for projecting an image on a rear projection screen.

Reference numeral 10 in FIG. 1 generally identifies a housing in which a lightweight, compact, image projection arrangement 20, as shown in FIG. 2, is mounted and operative for projecting a composite beam onto a stationary rear mirror 12 for reflection therefrom onto a rear projection screen comprising a collimating lens 14, a lenticular lens array 16, and an apertured mask 18, whose structure and function are described below in connection with FIGS. 8-12. An observer in front of the screen sees a two-dimensional, red, blue and green color image thereon, as described below.

Figure 3:
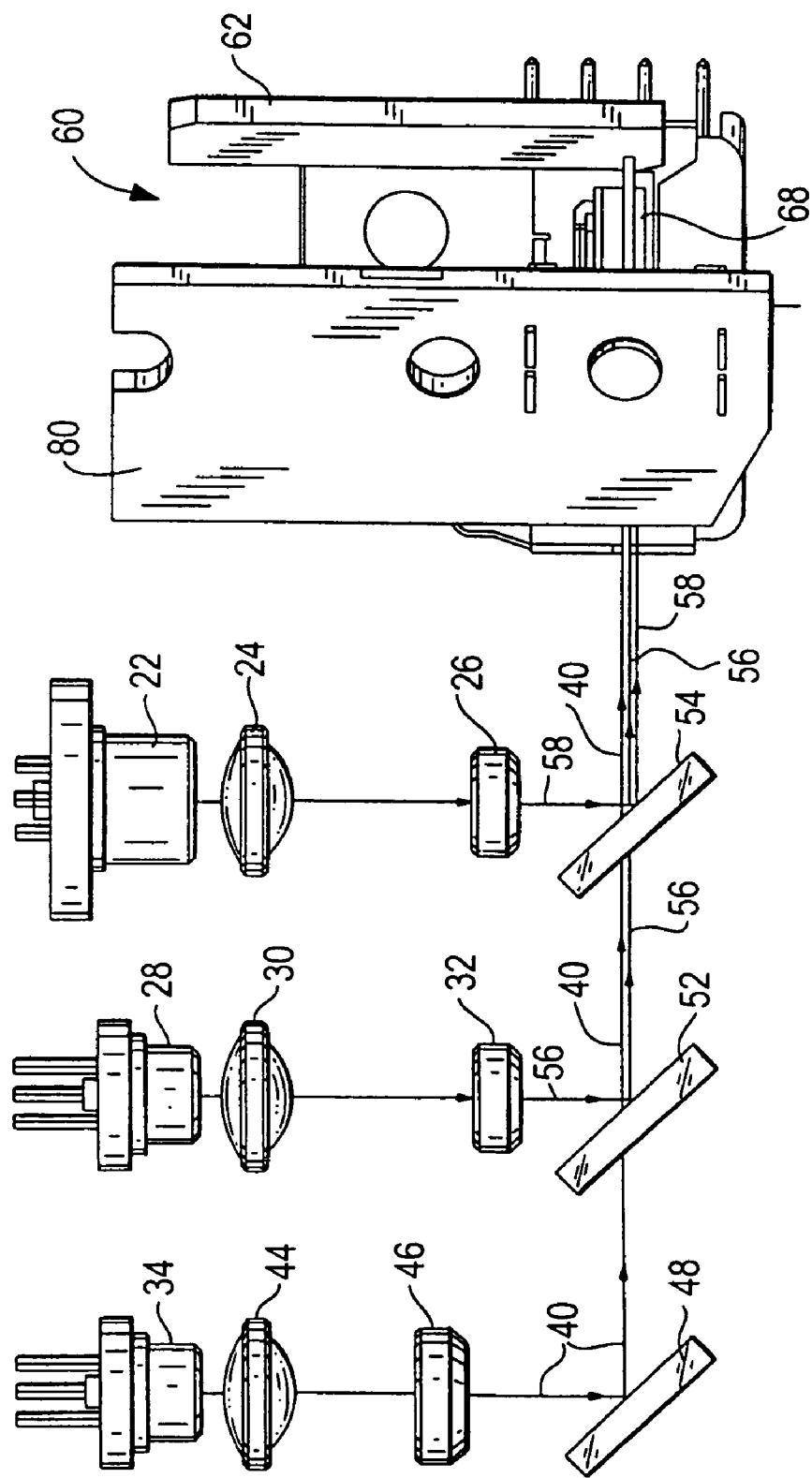
FIG. 3 is a top plan view of the arrangement of FIG. 2.

Referring to FIGS. 2 and 3, the arrangement 20 includes a solid-state, preferably a semiconductor laser 22 which, when energized, emits a bright red laser beam 58 at about 630-675 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity). The lenses 24, 26 focus the red beam onto the screen.

Another solid-state, semiconductor laser 28 is mounted on the support and, when energized, emits a diffraction-limited blue laser beam 56 at about 435-490 nanometers. Another biaspheric convex lens 30 and a concave lens 32 are employed to focus the blue beam on the screen in a manner analogous to lenses 24, 26.

Still another solid-state, semiconductor laser 34 is mounted on the support and, when energized, emits a diffraction-limited violet laser beam 40 having a wavelength preferably on the order of 400-415 nanometers. For some applications, shorter wavelengths on the order of 350-370 nanometers may be preferable. Still another biaspheric convex lens 44 and a concave lens 46 are employed to focus the violet beam 40 on the screen in a manner analogous to lenses 24, 26. The violet laser, instead of a green laser, is eventually used to generate a green beam, as described below, to create a full color, red, blue and green (RBG) image for viewing.

The arrangement includes a pair of dichroic filters 52, 54 arranged to make the violet, blue and red beams substantially collinear before reaching a scanning assembly 60. Filter 52 allows the violet beam 40 to pass therethrough, but the blue beam 56 from the blue laser 28 is reflected by the interference effect. Filter 54 allows the violet and blue beams 40, 56 to pass therethrough, but the red beam 58 from the red laser 22 is reflected by the interference effect.

Figure 4:
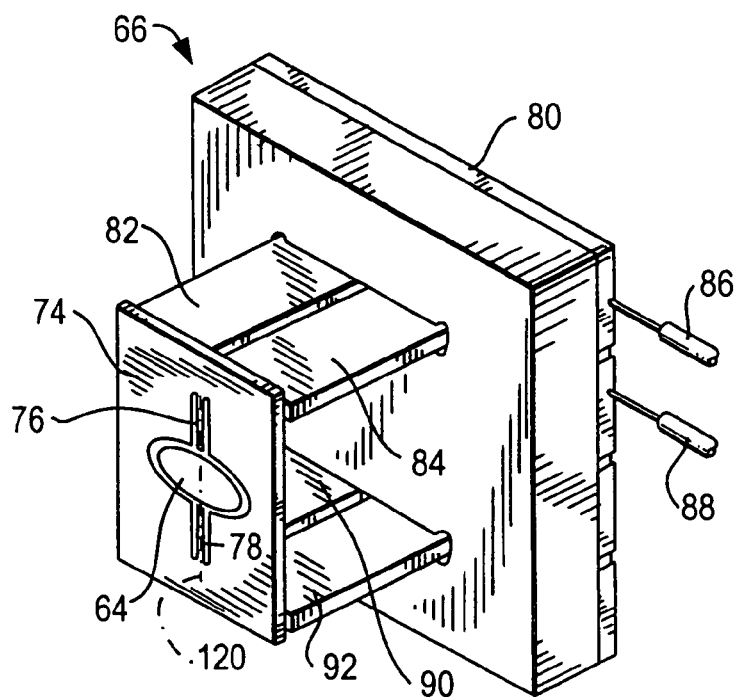
FIG. 4 is a perspective front view of an inertial drive for use in the arrangement of FIG. 2.
Figure 5:
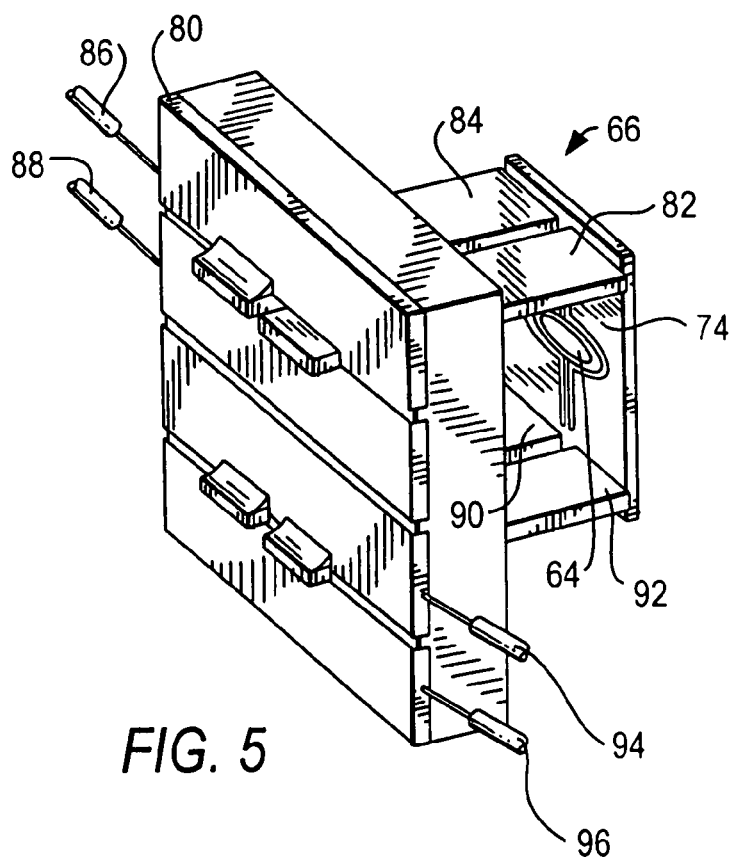
FIG. 5 is a perspective rear view of the inertial drive of FIG. 4.

The substantially co-linear beams 40, 56, 58 are directed as a composite beam to, and reflected off, a stationary bounce mirror 62. The scanning assembly 60 includes a first scan mirror 64 oscillatable by an inertial drive 66 (shown in isolation in FIGS. 4-5) at a first scan rate to sweep the composite beam reflected off the bounce mirror 62 over a horizontal scan angle, and a second scan mirror 68 oscillatable by an electromagnetic drive 70 at a second scan rate to sweep the composite beam reflected off the first scan mirror 64 over a vertical scan angle. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Although light can reflect off an outer surface of the scan mirror, it is desirable to coat the surface of the mirror 64 with a specular coating made of gold, silver, aluminum, or like material, or a highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard of 720 p, 1270×720 pixels can be displayed. In some applications, a one-half VGA quality of 320×480 pixels, or one-fourth VGA quality of 320 ×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive. The slower mirror is preferably moved at a constant velocity during the time that the image is displayed. During return of the mirror, the mirror moves at the significantly higher velocity of its resonant frequency, and the lasers are powered down in order to reduce power consumption.

Figure 6:
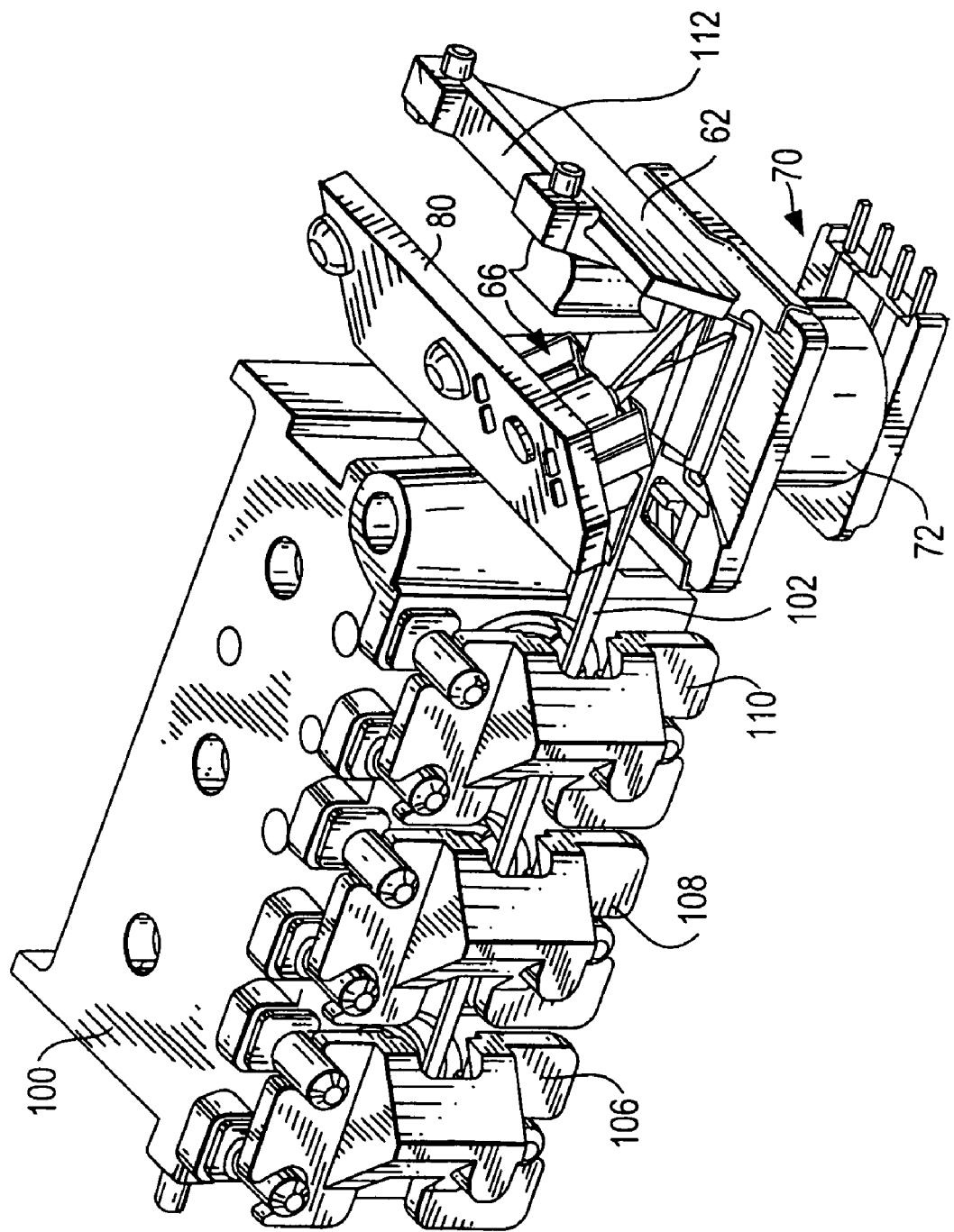
FIG. 6 is a perspective view of a practical implementation of the arrangement of FIG. 2.

FIG. 6 is a practical implementation of the arrangement 20 in the same perspective as that of FIG. 2. The aforementioned components are mounted on a support or chassis 100 and define an optical path 102. Holders 106, 108, 110, 112 respectively hold folding mirror 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and violet power controllers 116, 118, 120 respectively conduct electrical currents to the red, blue and violet lasers 22, 28, 34 to energize the latter to emit respective light beams at each selected pixel, and do not conduct electrical currents to the red, blue and violet lasers to deenergize the latter to non-illuminate the other non-selected pixels. The resulting pattern of illuminated and non-illuminated pixels comprise the image, which can be any display of human- or machine-readable information or graphic.

The composite beam is swept by the inertial drive from an end point along the horizontal direction at the horizontal scan rate to an opposite end point to form a scan line. Thereupon, the composite laser beam is swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. The green color is derived from the violet beam, as described below. Any color in the visible light spectrum can be formed by the selective superimposition of one or more of the laser beams, as described below. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
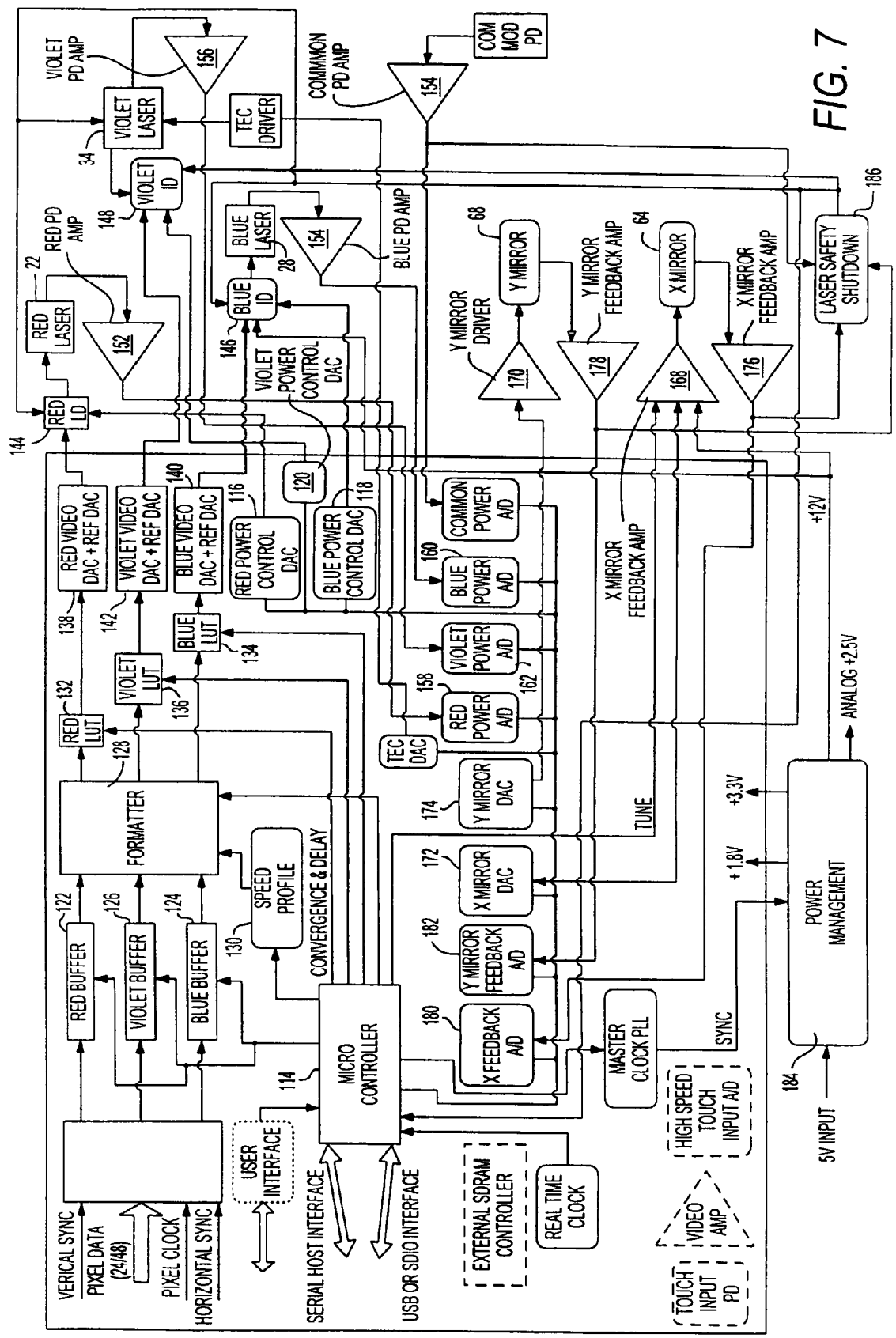
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and violet buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and violet look up tables (LUTs) 132, 134, 136 to correct inherent internal distortions caused by scanning, as well as geometrical distortions caused by the angle of the display of the projected image. The resulting red, blue and violet digital signals are converted to red, blue and violet analog signals by digital to analog converters (DACs) 138, 140, 142. The red, blue and violet analog signals are fed to red, blue and violet laser drivers (LDs) 144, 146, 148 which are also connected to the red, blue and violet power controllers 116, 118, 120.

Feedback controls are also shown in FIG. 7, including red, blue and violet photodiode amplifiers 152, 154, 156 connected to red, blue and violet analog-to-digital (A/D) converters 158, 160, 162 and, in turn, to the microprocessor 114.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the current of the red, blue and violet lasers just below the lasing threshold.

A laser safety shut down circuit 186 is operative to shut the lasers off if either of the scan mirrors 64, 68 is detected as being out of position.

To achieve a green color from a violet beam, the rear projection screen is modified. The composite (red, blue and violet) beam emanating from the projection arrangement 20 and, in turn, reflected off the rear mirror 12 in FIG. 1 is projected onto the collimating lens 14, which is preferably a Fresnel lens, as shown in more detail in FIGS. 8-9. The collimated light rays exiting the collimating lens is directed onto the lenticular lens array 16, also shown in more detail in FIGS. 8-9. The lenticular lens array 16 has a two-dimensional array of lenses 36, each operative for focusing the incoming collimated light rays in the plane of the apertured mask 18 and, more particularly, in apertures 38 thereof, as more clearly shown in the enlarged view of FIG. 10. Each lens 36 is about 50-100 microns in size and is preferably smaller than the basic pixel size of the screen.

Figures 8, 9:
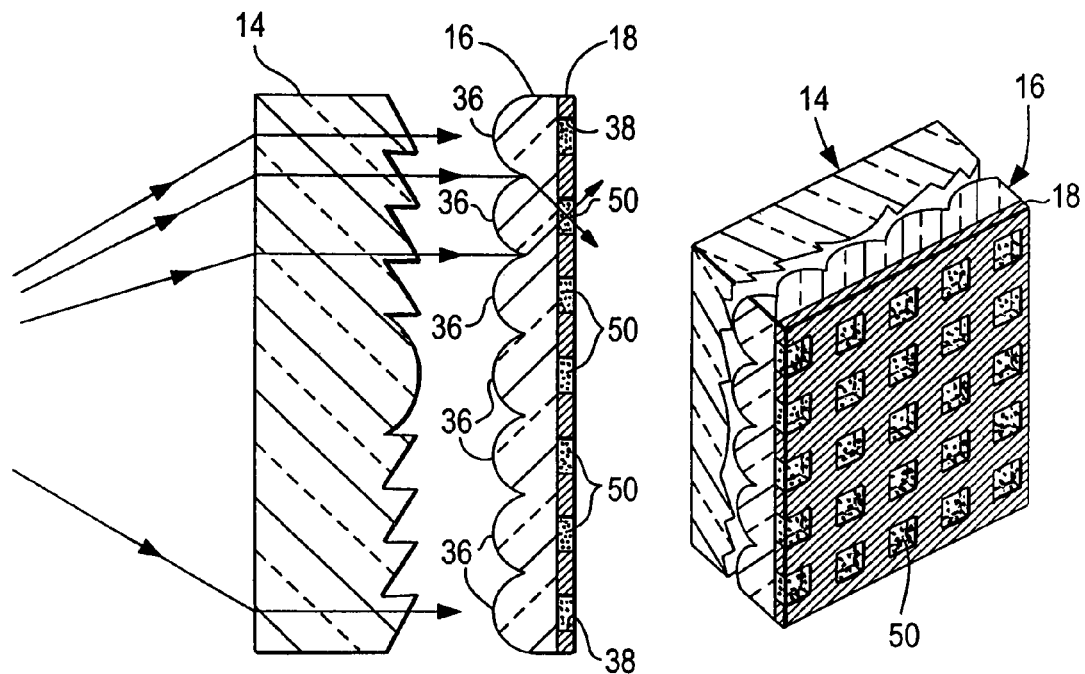
FIG. 8 is a sectional view of the projection screen on which the image is projected.
FIG. 9 is a perspective view of the screen of FIG. 8.
Figures 10, 11:
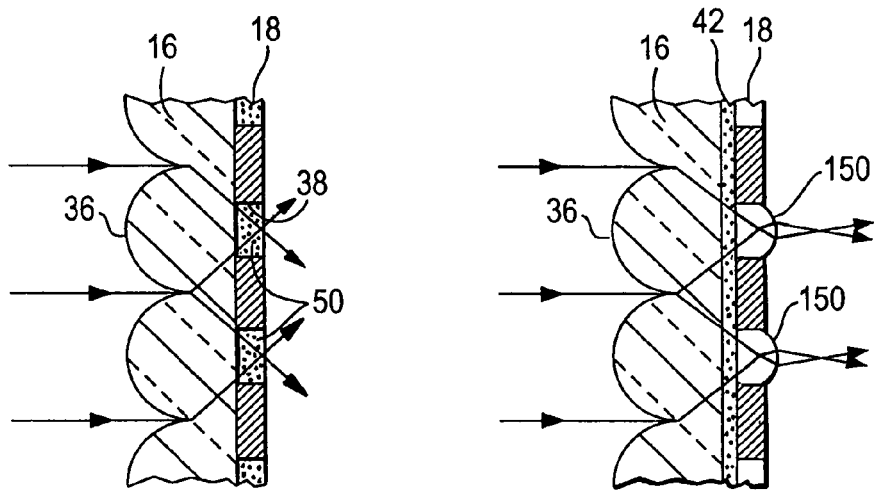
FIG. 10 is a broken-away sectional view of a detail of the projection screen of FIG. 8.
FIG. 11 is a view analogous to FIG. 10, but of another embodiment of the projection screen.

In FIGS. 8-10, each aperture 38 is filled with a phosphor 50 which, when excited by the incoming focused light, transmits/scatters the red and blue components of the incoming light, but creates green light from the violet component. In other words, the phosphor 50 responds only to the violet light to generate green light, but scatters the red and blue laser wavelengths essentially unchanged. It turns out, however, that a small fraction of the blue wavelength laser light is absorbed and converted to green light by the phosphor. This is advantageous since a small amount of green laser light is mixed with the blue laser light to simulate an effectively longer wavelength (460-480 nanometers) blue light, normally obtained in standard LCD and CRT displays. There are several phosphors that have this characteristic, especially phosphors being marketed by Nichia Corporation of Japan as Model Numbers NP-2211, NP-2221 and NP 108-83.

The lenses 36 can be highly selective in the amount of light that is transmitted/scattered along a certain direction, thereby insuring that most of the light is directed to a location where an observer is expected to be. For example, since the observer usually sits at the same height as the screen, there is no need for any radiation emitted from the screen to be greater than 10° along the vertical direction. Along the horizontal direction, the radiation need not be emitted over angles greater than 30°-40°. This enhances the gain or the amount of light that the observer sees.

Most of the area of the screen facing the viewer is dark. This lowers ambient reflection and enhances image contrast. By using a violet laser with the above-described phosphor, speckle noise is significantly reduced since the human eye is most sensitive to green. Rather than filling the apertures of the mask 18 with the phosphor, a separate phosphor plate 42, as shown in FIG. 11, is positioned adjacent the mask 18. Miniature lenses 150 on the order of 10-20 microns are positioned within the apertures of the mask to increase the gain.

The apertures 38 need not have a rectangular cross-section as shown in FIG. 9, but can have any cross-section, such as circular, oval, or square. The screen is, as described, a rear projection screen, especially useful as a television or monitor display. The screen can also be a front projection screen where the violet light is converted to green light, and wherein the red and blue laser beams are scattered back towards the observer.

In accordance with this invention, the phosphor plate 42 comprises a multitude of phosphor particles embedded in a binding material. The index of refraction of the binding material is selected to match the index of refraction of the phosphor particles more closely than air. Without such index of refraction matching, the phosphor particles, which are typically sized on the order of tens of microns in diameter, scatter most of the incident light backwards toward the red, blue and violet lasers, thereby significantly reducing the throughput efficiency of the rear projection screen. This light scattering is due to reflection at each particle interface. Due to such index of refraction matching, the reflections at the particle interfaces are reduced significantly, thereby reducing the light scattering. If the index matching were perfect, the phosphor plate would be transparent. In practice, the index matching is not perfect, and the phosphor plate is translucent, but still highly light-transmissive.

Figure 12:
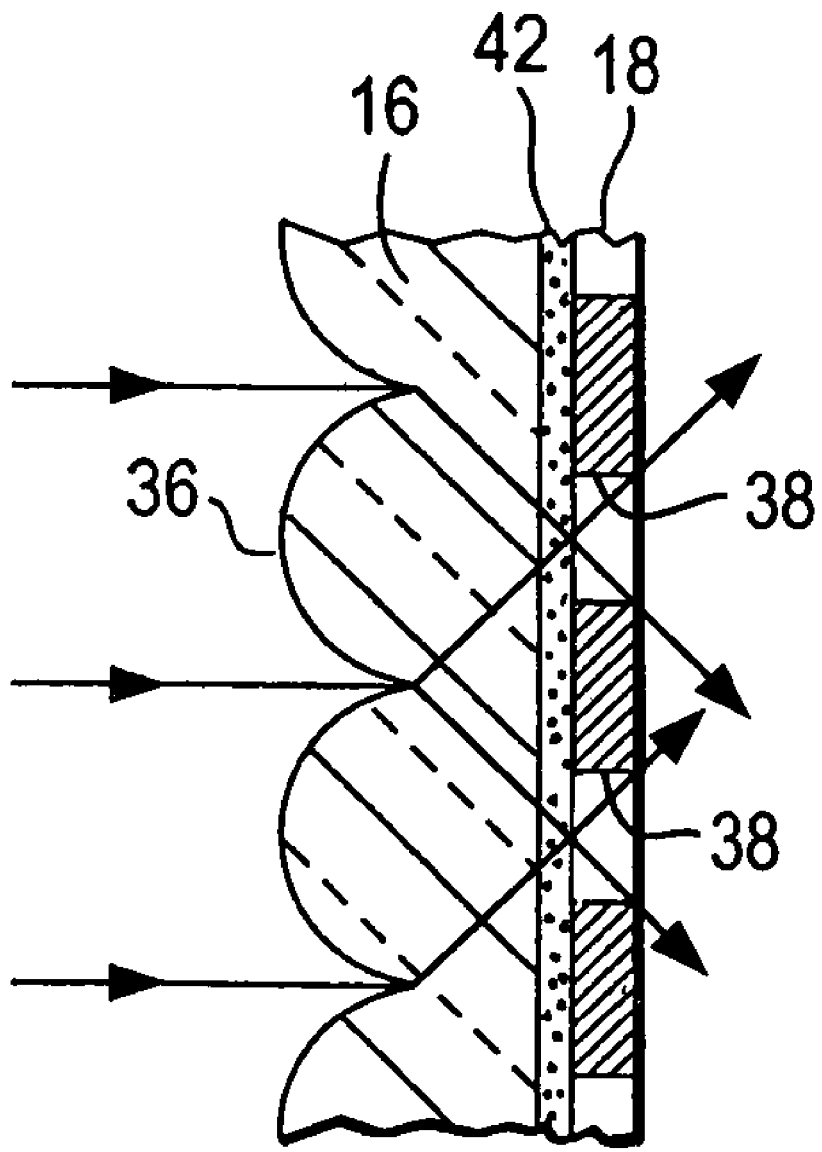
FIG. 12 is a view analogous to FIG. 11 and depicts an embodiment of the projection screen in accordance with this invention.

In FIG. 12, the phosphor plate 42 is placed at the focal plane of the lens array 16. The red, blue and violet laser beams are focused onto the phosphor plate at points adjacent the apertures 38 of the mask 18, which is preferably a light absorber. The red and blue beams pass unaffected through the light-transmissive phosphor plate 42 and the apertures 38. The violet beam is absorbed by the phosphor particles, and converted to green radiation which passes through the apertures 38. The green radiation is not directional, unlike the red and blue beams.

It will be understood that each of the elements described above, or two or more together, also may find a useful application in other types of constructions differing from the types described above.

While the invention has been illustrated and described as embodied in a color image projection system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection system for projecting a two-dimensional, color image, comprising:
   a) a projection screen;
   b) a laser assembly for emitting a composite beam comprised of a plurality of laser beams of different wavelengths toward the projection screen;
   c) a scanner for sweeping the composite beam in a pattern of scan lines across the projection screen, each scan line having a number of pixels;
   d) a controller operatively connected to the laser assembly and the scanner, for causing selected pixels to be illuminated, and rendered visible, by the composite beam to produce the image; and
   e) a light-transmissive member as part of the projection screen, including phosphor particles for converting one of the laser beams having a wavelength to a different wavelength to create the image in red, blue and green colors, and a binding material for binding the phosphor particles, the binding material having an index of refraction matching an index of refraction of the phosphor particles.

2. The image projection system of claim 1, wherein the laser assembly includes red, blue and violet semiconductor lasers for respectively generating red, blue and violet laser beams.

3. The image projection system of claim 1, wherein the laser assembly includes a violet, semiconductor laser, and wherein the phosphor particles produce a green laser beam when excited by the violet beam.

4. The image projection system of claim 1, wherein the scanner includes a first oscillatable scan mirror for sweeping the composite beam along a first direction at a first scan rate and over a first scan angle, and a second oscillatable scan mirror for sweeping the composite beam along a second direction substantially perpendicular to the first direction, and at a second scan rate different from the first scan rate, and at a second scan angle different from the first scan angle.

5. The image projection system of claim 4, wherein at least one of the scan rates exceeds audible frequencies to minimize noise.

6. The image projection system of claim 4, wherein at least one of the scan mirrors is oscillated by an inertial drive.

7. The image projection system of claim 1, wherein the controller includes means for energizing the laser assembly to illuminate the selected pixels, and for deenergizing the laser assembly to non-illuminate pixels other than the selected pixels.

8. The image projection system of claim 1, wherein the projection screen includes a collimating lens for collimating the laser beams.

9. The image projection system of claim 8, wherein the collimating lens is a Fresnel lens.

10. The image projection system of claim 8, wherein the projection screen includes a lenticular lens array having a plurality of lenses for focusing the collimated laser beams at a focusing plane.

11. The image projection system of claim 10, wherein the projection screen includes a mask having apertures.

12. The image projection system of claim 10, wherein the light-transmissive member is located in the focusing plane.

13. The image projection system of claim 11, wherein the light-transmissive member is formed as a plate in contact with the mask, and lying in the focusing plane.

14. The image projection system of claim 13, wherein the projection screen includes a plurality of lenslets, each extending through and past each aperture.

15. The image projection system of claim 1, and an optical assembly including dichroic filters, each operative for reflecting at least one of the beams and for transmitting at least one of the beams.

16. An image projection system for projecting a two-dimensional, color image, comprising:
   a) a projection screen;
   b) a laser assembly including red, blue and violet lasers for respectively emitting a plurality of red, blue and violet laser beams;
   c) an optical assembly for optically focusing and substantially collinearly arranging the laser beams to form a composite beam;
   d) a scanner for sweeping the composite beam in a pattern of scan lines across the projection screen, each scan line having a number of pixels;
   e) a light-transmissive member as part of the projection screen, including phosphor particles for converting the violet beam into a green laser beam, and a binding material for binding the phosphor particles, the binding material having an index of refraction matching an index of refraction of the phosphor particles; and
   f) a controller operatively connected to the scanner, for causing selected pixels to be illuminated, and rendered visible, by the composite beam to produce the image, the controller being operative for selecting at least some of the laser beams to illuminate the selected pixels to produce the image in red, blue and green colors.

17. The image projection system of claim 16, wherein the optical assembly includes a first dichroic filter for reflecting the blue beam and for transmitting the violet beam therethrough, and a second dichroic filter optically aligned with the first dichroic filter for reflecting the red beam and for transmitting the blue and violet beams therethrough, and a mirror optically aligned with the dichroic filters for reflecting the violet beam towards the dichroic filters.

18. The image projection system of claim 16, wherein the projection screen includes a collimating lens for collimating the red, blue and violet beams, a lenticular lens array for focusing the collimated red, blue and violet beams to a focusing plane in which the phosphor particles are located to convert the violet beam to a green beam, and a mask having apertures through which the red, blue and green beams pass.

19. The image projection system of claim 16, wherein the projection screen includes a plurality of lenslets extending through apertures of an apertured mask.

20. A method of projecting a two-dimensional, color image on a projection screen, comprising the steps of:
   a) emitting a composite beam comprised of red, blue and violet laser beams toward the screen;
   b) sweeping the composite beam as a pattern of scan lines across the screen, each scan line having a number of pixels;
   c) causing selected pixels to be illuminated, and rendered visible, by the composite laser beam to produce the image;
   d) converting the violet beam to a green beam by directing the violet beam to phosphor particles bound in a binding material; and
   e) reducing back scattering of the red, blue and violet beams by matching an index of refraction of the phosphor particles to an index of refraction of the binding material.

* * * * *